Nov. 17, 1936.  M. S. GRAVES  2,061,029
VEHICLE SAFETY BRAKE
Filed Jan. 26, 1935  2 Sheets-Sheet 1

Inventor
Mark S. Graves,
By Clarence A. O'Brien
Attorney

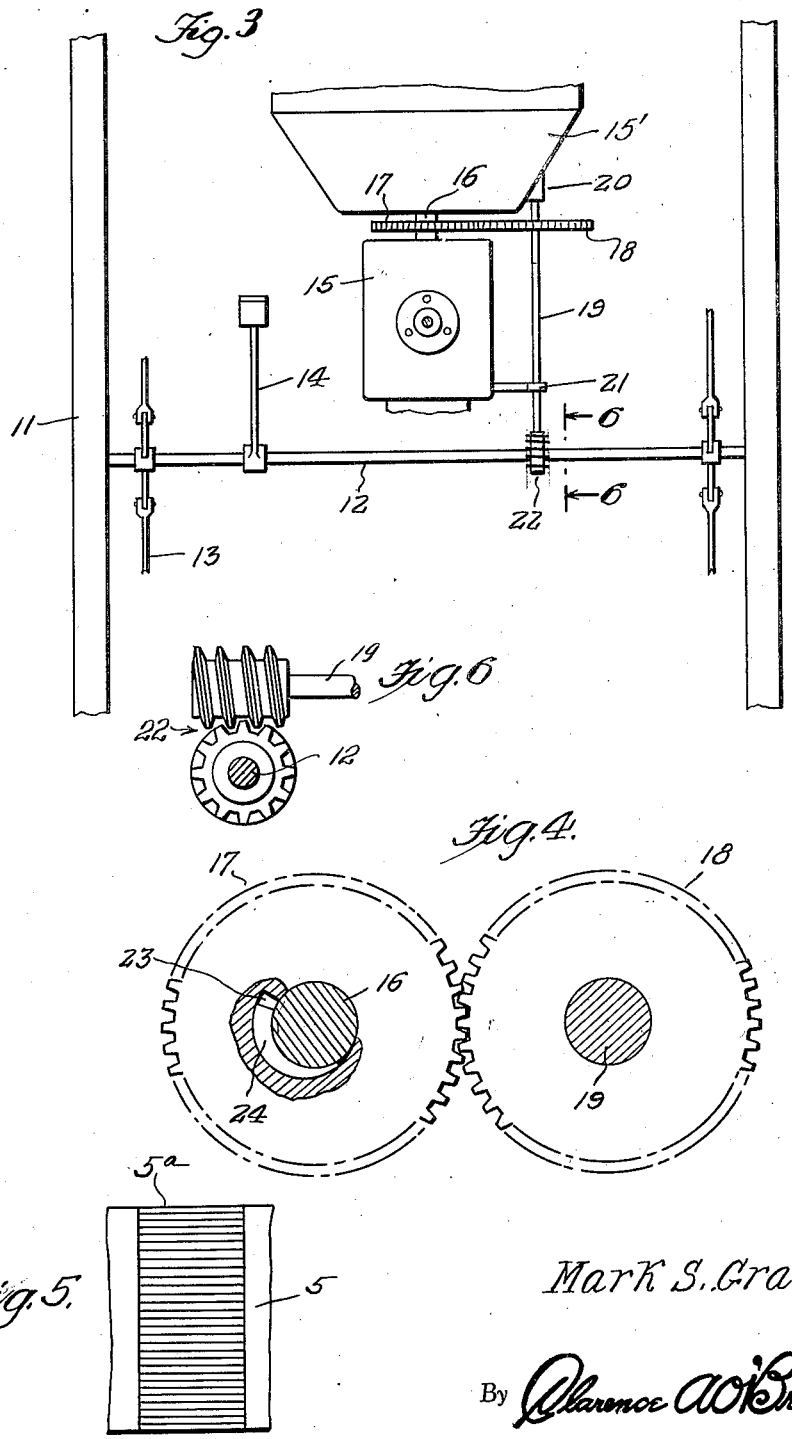

Patented Nov. 17, 1936

2,061,029

UNITED STATES PATENT OFFICE 2,061,029

VEHICLE SAFETY BRAKE

Mark S. Graves, Los Angeles, Calif.

Application January 26, 1935, Serial No. 3,661

3 Claims. (Cl. 188—30)

This invention relates to a safety brake for vehicles such as motor cars, trucks or the like, and the object of the invention is to provide a brake of this character which will automatically operate to prevent retrograde movement of an automobile when ascending an incline or when parked on a hill.

The invention, together with its objects and advantages, will be best understood from a study of the following description taken in connection with the accompanying drawings wherein:

Figure 3 is a plan view illustrating a slightly modified form of the invention.

Figure 4 is a detail view with parts broken away and shown in section illustrating the application of the second form of the invention.

Figure 5 is an elevation of a corrugated portion of the shaft with which the brake wedge is adapted to cooperate for preventing retrograde movement of the shaft.

Fig. 6 is a detail in cross section taken on the line 6—6 of Fig. 3.

Figure 1:
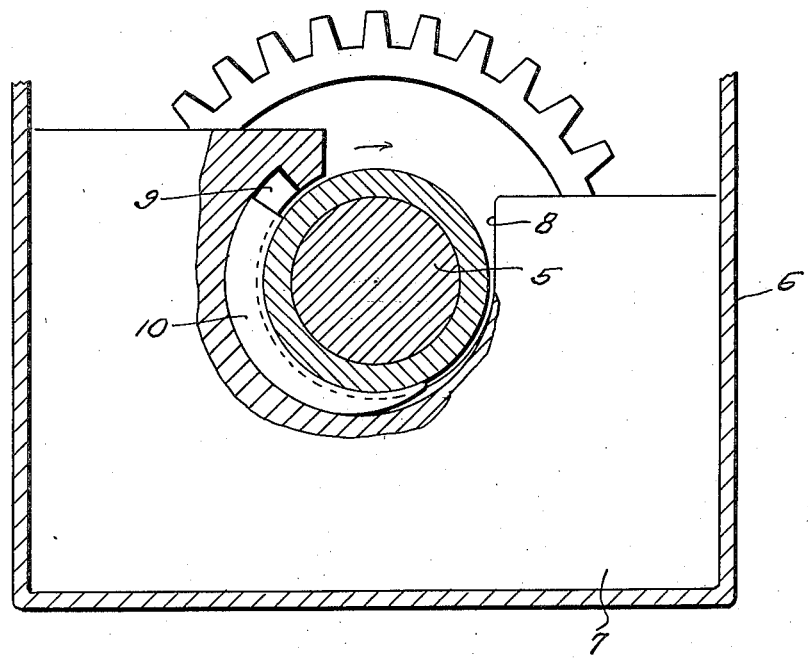
Figure 1 is a detail view illustrating the application of the invention to the countershaft of vehicle transmissions.
Figure 2:
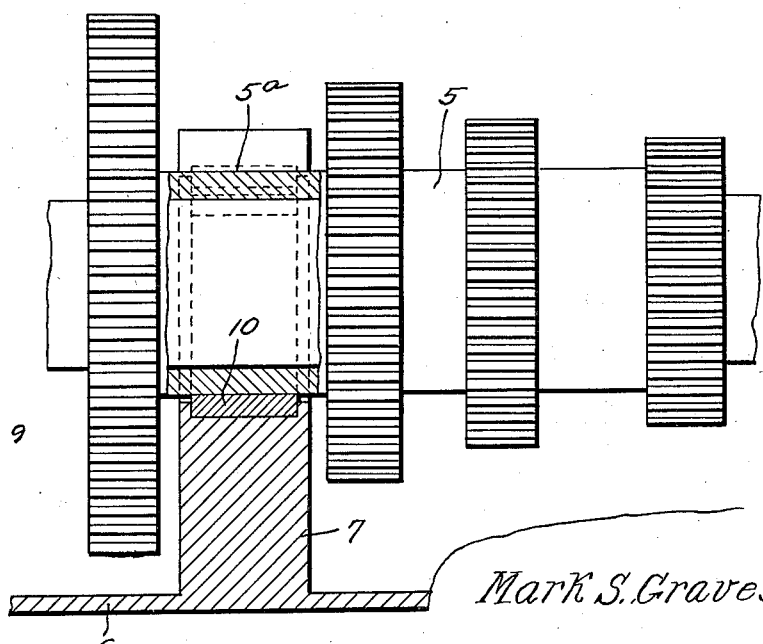
Figure 2 is a detail view taken at right angles to Figure 1.

In the form of the invention shown in Figures 1 and 2 the same is applied to operate in conjunction with the countershaft 5 of a vehicle transmission. In Figures 1 and 2 the transmission housing is indicated by the reference numeral 6, and in accordance with the present invention is provided with a transversely disposed partition 7 that is provided with an opening 8 to accommodate the countershaft 5. At one side of the opening 8 there is provided in the edge of the partition 7 a groove 9 that is disposed concentric to the shaft 5 and which increases in depth in a clockwise direction, having its greatest depth at the top of the opening 8 as shown in Figure 1. Arranged in the arcuate groove or channel 9 is a floating arcuate wedge 10, the same being thickest at its upper end and tapering to a thinner lower end. The wedge 10 has the convex face thereof in sliding contact with the concave wall of the channel 9 while the concave face of the wedge 10 is in contact with the roughened or corrugated section 5a of the countershaft 5.

From the above it will be apparent that with the device applied as just described, the countershaft 5 may rotate in the direction indicated by the arrow in Figure 1, freely, but upon reverse rotation of the countershaft 5, the wedge 10 which gravitates into sliding contact with the shaft 5 will be caused to automatically move inwardly towards the shallow end of the channel 9 under its weight and also under the urge of frictional engagement of shaft 5 therewith and thus set up a binding action on the shaft 5 which will prevent further retrograde or reverse movement of the shaft.

Thus with the device applied, it will be seen that a vehicle in climbing a hill will, should the vehicle begin to back down the hill, have a braking action applied thereto immediately upon rotation of the shaft 5 in a reverse direction. Upon resumption of forward drive of the vehicle, the braking action will be released.

The form of the invention illustrated in Figures 3 and 4 will now be described. In Figures 3 and 4 the chassis bars of the automobile are indicated by the reference numeral 11 while the brake shaft is indicated by the reference numeral 12, the brake bar by the reference numeral 13, and the brake pedal by the reference numeral 14. The transmission housing is indicated by the reference numeral 15 and the clutch housing by numeral 15, and in accordance with the present invention, in this form thereof, the clutch shaft indicated by the reference numeral 16 has mounted thereon and normally free of driving engagement therewith a gear 17 with which a second gear 18 is constantly in mesh. The gear 18 is mounted on a shaft 19 that is suitably supported as at 20 and 21 and at one end is in operative connection with the brake shaft 12 through the medium of suitable gearing 22.

As shown in Figure 4, the gear 17 in the region of the hub portion thereof is provided with a substantially C-shaped channel slot 23 corresponding to the aforementioned slot 9 and operating in this slot 23 is a floating curved wedge 24 similar to the aforementioned wedge 10. Also the part of the clutch shaft 16 with which the wedge 24 engages is preferably corrugated. The operation of this form of the invention will now be described. The clutch shaft 16 as viewed in the direction indicated by Fig. 4 rotates in a clockwise direction, that is in a direction counter to the wedge 24 so that the shaft will revolve independent of the gear 17 and the latter thus be maintained stationary. In event the automobile be brought to a stop in ascending a grade while in gear, as on throwing out the clutch or stalling the motor such that the automobile would normally tend to roll backward down the grade and thereby rotate the clutch shaft through the transmission gearing in a retrograde or counter-clockwise direction, when the transmission is set for a forward speed, thereby causing the wedge 24 to effect interengagement between the shaft 16 and gears 17 to effect rotation of the latter and thereby drive gear 18, shaft 19, gearing 22, and shaft 12 to turn the latter in a direction to effect application of the vehicle brakes and thus prevent the automobile from rolling backward down the hill. In this fashion the wedge 24 will act as a one-way clutch to cause the vehicle brakes to be automatically applied whenever the shaft is rotated rearwardly regardless of whether or not pedal 14 is depressed to effect manual application of the brakes.

In event the vehicle or automobile is stopped while descending a grade in a forward direction and the transmission is set for reverse, such that forward movement of the vehicle will impell the clutch shaft 16 backward, the one-way clutch afforded by the wedge 24 will be effective to apply the brakes and hold the automobile against forward movement while the transmission remains set in reverse.

While I have described the invention as used in connection with motor vehicles, it will be understood that the same may be applied to any driven shaft to prevent retrograde movement of the latter.

What is claimed is:

1. In a braking device for a motor driven vehicle in combination, a clutch shaft, a gear mounted on the clutch shaft, a second shaft, a brake shaft, gearing connecting the second shaft with the brake shaft, a gear on the second shaft in constant mesh with the first named gear, and wedge means engageable with the first gear and the clutch shaft for placing the first named gear in driving engagement with the clutch shaft in a manner to effect application of the brakes of the vehicle on retrograde movement of the clutch shaft.

2. In a braking device for motor driven vehicles in combination, a clutch shaft, a gear mounted on the clutch shaft, a second shaft, a brake shaft, gearing connecting the second shaft with the brake shaft, a gear on the second shaft in constant mesh with the first named gear, and wedge means engageable with the first gear and the clutch shaft for placing the first named gear in driving engagement with the clutch shaft in a manner to effect application of the brakes of the vehicle on retrograde movement of the clutch shaft; said means including a tapered channel provided in the hub of the first named gear and extending concentric to the clutch shaft, and a curved wedge operating in the channel and adapted to wedge into position between the concave wall of the channel and the periphery of the clutch shaft upon rotation of the clutch shaft in a reverse direction, and to relieve the first named gear upon rotation of the clutch shaft in a forward direction.

3. In a braking device for motor driven vehicles, a clutch shaft, a gear loose on said clutch shaft having a tapered channel in the hub thereof extending concentric to the clutch shaft, a curved wedge floating in said channel adapted to automatically wedge into position between the periphery of said shaft and the concave wall of the channel in said gear upon rotation of the clutch shaft in a reverse direction, a brake shaft, and means connecting said gear to said brake shaft for operating the latter to apply the vehicle brakes on rotation of said gear with said clutch shaft.

MARK S. GRAVES.